United States Patent [19]

Senda et al.

[11] Patent Number: 4,604,676

[45] Date of Patent: Aug. 5, 1986

[54] CERAMIC CAPACITOR

[75] Inventors: Atsuo Senda; Toshi Numata; Takuji Nakagawa; Yoshifumi Ogiso, all of Nagaokakyo, Japan

[73] Assignee: Murata Manufacturing Co., Ltd., Japan

[21] Appl. No.: 782,217

[22] Filed: Sep. 30, 1985

[30] Foreign Application Priority Data

| Oct. 2, 1984 | [JP] | Japan | 59-207363 |
| Oct. 2, 1984 | [JP] | Japan | 59-207364 |
| Oct. 2, 1984 | [JP] | Japan | 59-207365 |
| Oct. 2, 1984 | [JP] | Japan | 59-207366 |
| Oct. 2, 1984 | [JP] | Japan | 59-207369 |
| Dec. 28, 1984 | [JP] | Japan | 59-281814 |
| Dec. 28, 1984 | [JP] | Japan | 59-281815 |
| Apr. 30, 1985 | [JP] | Japan | 60-94079 |

[51] Int. Cl.$^4$ .......................... H01G 1/14; H01G 4/10
[52] U.S. Cl. ........................................ 361/309; 361/321
[58] Field of Search ................ 361/308, 309, 310, 321

[56] References Cited

U.S. PATENT DOCUMENTS

| 3,284,684 | 11/1966 | Gaenge | 361/309 |
| 3,809,973 | 5/1974 | Hurley | 361/309 |
| 4,458,294 | 7/1984 | Womack | 361/321 |

FOREIGN PATENT DOCUMENTS

| 151529 | 10/1981 | German Democratic Rep. | 361/321 |
| 28145 | 4/1970 | Japan. | |
| 167318 | 12/1981 | Japan | 361/321 |
| 187925 | 5/1982 | Japan. | |
| 1224124 | 3/1971 | United Kingdom | 361/308 |

Primary Examiner—Donald A. Griffin
Attorney, Agent, or Firm—Ostrolenk, Faber, Gerb & Soffen

[57] ABSTRACT

A monolithic ceramic capacitor comprises a dielectric ceramic element assembly, metal electrodes for external connection and conductive metal oxide layers formed between the ceramic element assembly and the metal electrodes for preventing reduction of metal oxide forming the dielectric ceramic material.

12 Claims, 2 Drawing Figures

CERAMIC CAPACITOR

BACKGROUND OF THE INVENTION

1. Field of the Invention

The present invention relates to a ceramic capacitor, and more particularly, it relates to a highly reliable monolithic ceramic capacitor, which can prevent deterioration of insulation resistance under a high temperature ambience.

2. Description of the Prior Art

In recent years, light and small ceramic capacitors have been discussed in the art with development of lightweight miniature electronic components. In particular, study has been made on provision of ceramic capacitors with large capacitance which are small in size with thin-film structure.

Improved thin-film ceramic capacitors may be obtained by the following methods:

(1) To form thin-film dielectric ceramic layers by vacuum thin-film forming methods such as sputtering, vacuum evaporation, ion plating and chemical vapor deposition.

(2) To employ fine grain dielectric ceramic materials thereby to reduce thickness of the dielectric ceramic layers.

(3) To provide insulation layers in grain boundaries of thin-film semiconductor ceramic layers thereby to obtain grain boundary barrier layer type dielectric ceramic layers.

(4) To define inner electrodes between a plurality of dielectric ceramic layers obtained by the above methods (1) to (3) respectively, thereby to form monolithic ceramic capacitors with large capacitance.

However, various problems are caused in ceramic capacitors comprising the thin-film dielectric ceramic layers obtained by the aforementioned methods and electrodes formed therein by sputtering, vacuum evaporation, ion plating, chemical vapor deposition or electroless plating for obtaining capacitance. A particularly remarkable problem is deterioration of insulation resistance under a high temperature ambience.

The most significant cause for such a problem is that dielectric ceramics are formed by metal oxide while the electrodes are made of metals. In other words, such combination inevitably causes transfer of oxygen at the contact surfaces between the metal oxide forming the dielectric ceramics and the metals forming the electrodes. Such transfer of oxygen is not observed under the normal temperature, whereas the same is facilitated by increase in temperature.

In, for example, a ceramic capacitor comprising a dielectric ceramic member of titanium dioxide ($TiO_2$) and electrodes of copper (Cu), titanium dioxide and copper are changed under a high temperature of, e.g., 150° C. as follows:

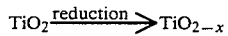

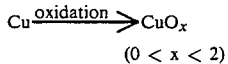

$$(0 < x < 2)$$

When transfer of oxygen thus takes place between the dielectric ceramic member and the electrodes, the dielectric constant $\epsilon$ of the dielectric ceramic member is changed while insulation resistance IR thereof is significantly lowered substantially over two figures.

Such a phenomenon remarkably takes place in thin-film dielectric layers of each of the ceramic capacitors obtained by the aforementioned methods (1) to (4).

Description is now made on Japanese Patent Publication Gazette No. 28145/1970, which discloses technique similar to the present invention.

According to this prior art example, a solution for forming a film of tin oxide is directly sprayed or coated on the surface of a member of lead zirconate titanate ceramics or barium titanate ceramics etc. to form the tin oxide film, on which silver paste is baked. This prior art example is considered to attain adhesion greater than that of conventional silver electrodes, together with soldering adhesion strength.

However, the tin oxide film is formed by spraying or coating a solution of tin tetrachloride ($SnCl_4.5H_2O$), antimony trichloride ($SbCl_3$) and hydrochloric acid (HCl) on the ceramic member heated at about 700° C., and hence chlorine, which belongs to the halogen group, remains in the tin oxide film formed on the surface of the ceramic member. Thus, the remaining chlorine causes corrosion of metal electrodes for external connection. Further, the said solution sprayed or coated on the thin-film ceramic member penetrates into the same to reduce the insulation resistance thereof, in the worst case.

On the other hand, Japanese Patent Laying-open Gazette No. 187925/1982 discloses a ceramic capacitor which comprises a ceramic dielectric substrate provided on its surfaces with metal oxide layers, first metal layers of either nickel or copper formed thereon and second metal layers of gold, platinum, silver, tin or tin alloy formed on the first metal layers. According to this prior art example, the metal oxide films absorb gas components generated from the ceramic dielectric substrate by heat treatment thereby to prevent the first metal layers of nickel or copper from being separated from the ceramic dielectric substrate. Further, the first metal layers are excellent in adhesion strength with respect to the metal oxide layers, while that with respect to the second metal layers formed thereon is sufficiently secured. Thus, electrodes of the ceramic capacitor are not separated even if the same are exposed to heat in a die bonding process.

There is, however, no description about a monolithic ceramic capacitor in the said prior art example.

SUMMARY OF THE INVENTION

Accordingly, an object of the present invention is to provide a highly reliable monolithic ceramic capacitor in such structure that the dielectric ceramic material is not reduced under a high temperature thereby to prevent change in dielectric constant and deterioration of insulation resistance.

Briefly stated, the present invention provides a ceramic capacitor comprising a monolithic dielectric ceramic element assembly formed by a dielectric ceramic member consisting of a plurality of layers of metal oxide and a plurality of inner metal electrodes laminated with each other through the dielectric ceramic member to form electrostatic capacity, which dielectric ceramic element assembly is provided with metal electrodes for external connection connected with prescribed ones of the inner metal electrodes for obtaining electrostatic capacity, in which conductive metal oxide layers are formed between the dielectric ceramic element assembly and the metal electrodes for external connection.

DESCRIPTION OF THE PREFERRED EMBODIMENTS

Figure 1:
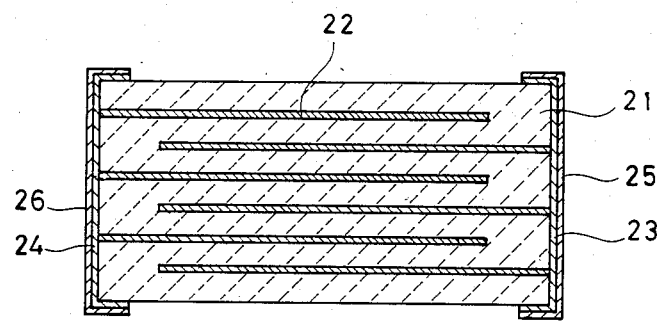
FIG. 1 is a sectional view showing an example of a ceramic capacitor according to the present invention.

Referring to FIG. 1, a dielectric ceramic member 21 of metal oxide is provided therein with a plurality of inner electrodes 22 which are laminated through the same. Formed on end surfaces of the dielectric ceramic member 21 are metal electrodes 25 and 26 for external connection, which are connected with prescribed ones of the inner metal electrodes 22 to obtain electrostatic capacity. Conductive metal oxide layers 23 and 24 are provided between the end surfaces of the dielectric ceramic member 21 and the metal electrodes 25 and 26 for external connection. The dielectric ceramic member 21 is obtained by forming conductive paste layers on a ceramic green sheet to define the inner metal electrodes 22, which are successively laminated and subjected to thermocompression bonding, and firing the substance thus formed. Therefore, the fired substance may be regarded as a single sintered ceramic member.

The said dielectric ceramic member 21 of metal oxide may be prepared by, e.g., the following materials:

(1) Ceramics of high dielectric constant such as barium titanate ceramics and strontium titanate ceramics.

(2) Temperature compensation dielectric ceramics such as titanium oxide ceramics, magnesium titanate ceramics, magnesium oxide-titanium oxide ceramics and silicon oxide ceramics.

(3) Reduction reoxidation type semiconductor ceramics having insulation layers formed by oxidation processing on the surfaces of a barium titanate semiconductor ceramic member.

(4) Grain boundary barrier layer type dielectric ceramics obtained by insulating grain boundaries of a semiconductor ceramic capacitor.

Particularly a monolithic ceramic capacitor is applied as follows:

(1) Monolithic ceramic capacitor of a ceramic material which is not reduced upon firing in a reduction atmosphere provided with inner electrodes of base metals such as iron (Fe), nickel (Ni) and cobalt (Co), as disclosed in U.S. Pat. No. 4,115,493.

(2) Monolithic ceramic capacitor having inner electrodes of lead or lead alloy and formed by injecting molten lead or lead alloy in clearances defined in a previously fired ceramic member and solidifying the same, as disclosed in U.S. Pat. No. 3,679,950.

The conductive metal oxide layers are most effectively applied between a dielectric ceramic member being not more than 50 μm in thickness and the electrodes for external connection. In other words, no remarkable change in dielectric constant and deterioration in insulation resistance are observed in a dielectric ceramic member exceeding 50 μm in thickness even if reduction of the dielectric ceramic material is caused by the electrodes under a high temperature, since the dielectric ceramic member is sufficiently thick. Thus, the present invention is particularly effective on dielectric ceramic members being not more than 50 μm in thickness.

The material for the conductive metal oxide layers is selected from the group of manganese oxide, iron oxide, cobalt oxide, nickel oxide, zinc oxide, indium oxide, indium tin oxide and tin oxide.

Zinc oxide for forming the conductive metal oxide layers contains 0.5 to 99.9 percent by mol of at least one of iron oxide, zirconium oxide, indium oxide, tin oxide and lead oxide.

The conductive metal oxide layers are formed by a thin-film forming method selected from sputtering, ion plating, vacuum evaporation and chemical vapor deposition. When the sputtering method is employed, the metal oxide layers can be formed by using a metal corresponding to each oxide layer as a target to be sputtered in a sputtering atmosphere of mixed gas of argon and oxygen. In the case where the vacuum evaporation method is employed, the metal oxide layers can be formed by heating the metal or metal powder corresponding to each layer and evaporating the same in an atmosphere containing oxygen. In the case of the chemical vapor deposition method, further, an organic metal complex may be employed to be generated in each of the conductive metal oxide layers. Examples of such organic metal complex are tin acetylacetonate, indium acetylacetonate, nickel acetylacetonate, zinc acetylacetonate, iron acetylacetonate, cobalt acetylacetonate, mixed solution of tin acetylacetonate and indium acetylacetonate, and manganese acetylacetonate.

Thickness of the conductive metal oxide layers is preferably not more than 2 μm, since thickness in excess of 2 μm leads to increase in equivalent series resistance (ESR).

Figure 2:
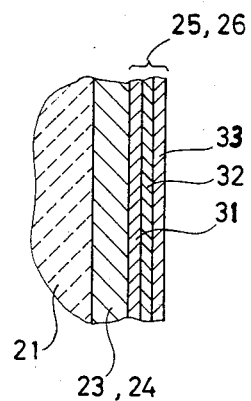
FIG. 2 is a partially enlarged sectional view showing another example of the ceramic capacitor according to the present invention.

The material for the metal electrodes for external connection is not particularly restricted, and the same may be prepared by one of or combination of two or more generally used metals such as silver (Ag), gold (Au), chromium (Cr), zirconium (Zr), vanadium (V), nickel (Ni), zinc (Zn), copper (Cu), tin (Sn), lead-tin (Pb-Sn), manganese (Mn), molybdenum (Mo), tungsten (W), titanium (Ti), palladium (Pd) and aluminum (Al). Further, the metal electrodes for external connection may be in multilayer structure in the form of, e.g., Cr (first layer) - Cu (second layer) or in the form of Cr (first layer 31) - Ni (second layer 32) - Ag (third layer 33) or Cr, Ti, W, V, Ta, Nb, Co, Fe, Zn, Mo, Mg, Be or Ni alloy (first layer 31) - Ni (second layer 32) - Ag, Pb, Pb-Sn, Sn, Cu or Au (third layer 33) as shown in FIG. 2.

Detailed description is now made on Examples of the present invention.

EXAMPLE 1

Ceramic dielectric powder material was prepared in the following composition:
$Nd_2Ti_2O_7$: 63 percent by mol
$BaTiO_3$: 14 percent by mol
$TiO_2$: 23 percent by mol.

The powder material was mixed with a binder of polyvinyl alcohol, a surface active agent, a dispersing agent and water to form slurry. The slurry was subjected to a doctor blade coater to form a ceramic green sheet of 35 μm in thickness.

The ceramic green sheet was cut into fragments respectively being 7.0 mm in length and 5.0 mm in width, to be printed with Ag-Pd paste containing 70 percent by weight of silver and 30 percent by weight of palladium.

Eleven ceramic green sheets thus provided with inner electrodes were so laminated that the inner electrodes were exposed on end surfaces of the laminated substance, which was fired at 1250° C. in the air to obtain a sintered unit. Thickness of each dielectric layer was 20 μm in the laminated substance thus obtained.

The conductive metal oxide layers were formed by sputtering on the end surfaces of the laminated sintered unit exposing the inner electrodes.

The conductive metal oxide layers were formed under the following conditions:

(1) Manganese Oxide Layer

Sputtering atmosphere: argon containing 10 percent of oxygen.
Pressure: $2 \times 10^{-3}$ Torr.
Target: manganese plate of 5 inches in diameter and 6 mm in thickness.
Voltage: 500 V (DC).
Current: 2.0 A.
Sputtering time: 5 min.
Thickness of manganese oxide layer: 2000 Å.

(2) Iron Oxide Layer

Sputtering atmosphere: argon containing 10 percent of oxygen.
Pressure: $2 \times 10^{-3}$ Torr.
Target: iron plate of 5 inches in diameter and 5 mm in thickness.
Voltage: 500 V (DC).
Current: 2.0 A.
Sputtering time: 5 min.
Thickness of iron oxide layer: 2000 Å.

(3) Cobalt Oxide Layer

Sputtering atmosphere: argon containing 10 percent of oxygen.
Pressure: $2 \times 10^{-3}$ Torr.
Target: cobalt plate of 5 inches in diameter and 3 mm in thickness.
Voltage: 500 V (DC).
Current: 2.0 A.
Sputtering time: 5 min.
Thickness of cobalt oxide layer: 2000 Å.

(4) Nickel Oxide Layer

Sputtering atmosphere: argon containing 10 percent of oxygen.
Pressure: $2 \times 10^{-3}$ Torr.
Target: nickel plate of 5 inches in diameter and 3 mm in thickness.
Voltage: 500 V (DC).
Current: 2.0 A.
Sputtering time: 5 min.
Thickness of nickel oxide layer: 2000 Å.

(5) Zinc Oxide Layer

Sputtering atmosphere: argon containing 50 percent of oxygen.
Pressure: $5 \times 10^{-3}$ Torr.
Target: zinc plate of 5 inches in diameter and 5 mm in thickness as shown in Table 1.
Voltage: 1.2 kV (DC).
Current: 120 mA.
Sputtering time: 45 min.
Thickness of zinc oxide layer: 0.3 μm.

TABLE 1

| Sample No. | Target (mol %) Zn | Target (mol %) Additive | Insulation Resistance After 100 Hours (Ω) | Insulation Resistance by High-Temperature Accelerated Load Life Test After 500 Hours (Ω) |
| --- | --- | --- | --- | --- |
| 1-1 | 98 | Fe: 2 | $>5 \times 10^{10}$ | $>5 \times 10^{10}$ |
| 1-2 | 98 | Zr: 2 | $>5 \times 10^{10}$ | $>5 \times 10^{10}$ |
| 1-3 | 97 | In: 3 | $>5 \times 10^{10}$ | $>5 \times 10^{10}$ |
| 1-4 | 97 | Sn: 3 | $>5 \times 10^{10}$ | $>5 \times 10^{10}$ |
| 1-5 | 95 | Pb: 5 | $>5 \times 10^{10}$ | $>5 \times 10^{10}$ |
| 1-6 | 96 | Pb: 2 Fe: 2 | $>5 \times 10^{10}$ | $>5 \times 10^{10}$ |
| 1-7 | 80 | In: 10 Sn: 10 | $>5 \times 10^{10}$ | $>5 \times 10^{10}$ |
| 1-8 | 85 | In: 5 Sn: 5 Fe: 5 | $>5 \times 10^{10}$ | $>5 \times 10^{10}$ |
| 1-9* | 100 | — | — | — |
| 1-10* | 99.3 | Zr: 0.2 | — | — |
| 1-11* | 99.6 | Fe: 0.4 | — | — |

*Sample Nos. 1-9 to 1-11 were significantly deteriorated in insulation resistance, which was unable to measure.

(6) Indium Oxide Layer

Sputtering atmosphere: argon containing 10 percent of oxygen.
Pressure $2 \times 10^{-3}$ Torr.
Target: indium oxide plate of 5 inches in diameter and 10 mm in thickness.
Voltage: 480 V (DC).
Current: 1.0 A.
Sputtering time: 30 min.
Thickness of indium oxide layer: 3500 Å.

(7) Indium Tin Oxide Layer

Sputtering atmosphere: argon containing 10 percent of oxygen.
Pressure: $2 \times 10^{-3}$ Torr.
Target: sintered body of indium tin oxide of 5 inches in diameter and 10 mm in thickness.
Voltage: 400 V (DC).
Current: 0.5 A.
Sputtering time: 5 min.
Thickness of indium tin oxide layer: 3500 Å.

(8) Tin Oxide Layer

Sputtering atmosphere: argon containing 10 percent of oxygen.
Pressure: $2 \times 10^{-3}$ Torr.
Target: tin plate of 5 inches in diameter and 5 mm in thickness containing 5 percent by atom of antimony.
Voltage: 500 V (DC).
Current: 2.0 A.
Sputtering time: 5 min.
Thickness of tin oxide layer: 3500 Å.

The metal electrodes for external connection were provided on the respective conductive metal oxide layers by forming Ni-Cr (Cr) layers serving as solder-dip resistant layers by vacuum evaporation.

The Ni-Cr layers were formed under the following conditions:
Evaporation source: Ni-Cr powder.
Pressure: $8 \times 10^{-6}$ Torr.
Time: 30 sec.
Thickness: 5000 Å.
Cr layers may be formed under similar conditions.

Thereafter Ni layers were formed as solder-dip resistant layers on the Ni-Cr layers (Cr layers) by sputtering.

The Ni layers were formed under the following conditions:
Sputtering atmosphere: argon.
Pressure: $2 \times 10^{-3}$ Torr.
Target: nickel plate of 5 inches in diameter and 2 mm in thickness.
Voltage: 480 V (DC).
Current: 2.0 A.
Time: 3 min.
Thickness: 2000 Å.

Further, Ag layers were formed on the Ni layers by sputtering as the third layers of the electrodes for external connection, to serve as layers capable of soldering.

The Ag layers were formed under the following conditions:
Sputtering atmosphere: argon.
Pressure: $2 \times 10^{-3}$ Torr.
Target: silver plate of 5 inches in diameter and 5 mm in thickness.
Voltage: 540 V (DC).
Current: 2.0 A.
Time: 6 min.
Thickness: 1 $\mu$m.

The respective monolithic capacitors prepared through the aforementioned processes were subjected to high-temperature accelerated load life tests as follows:

The capacitors were set in a temperature atmosphere of 150° C. with application of voltage of 300 V, i.e., six times the rated voltage (50 V). Insulation resistance IR measured after a lapse of 100 hours was $10^{11}\Omega$ in each case. It is to be noted that the initial value of the insulation resistance IR of each monolithic capacitor was $10^{11}\Omega$.

The monolithic capacitors were further set in an atmosphere of 45° C. in temperature and 95% in relative humidity with application of the rated voltage of 50 V. The insulation resistance IR measured after a lapse of 500 hours was $10^{11}\Omega$ in each case, in which no change was observed in comparison with the initial value.

With respect to the conductive metal oxide layers of zinc oxide, the results are shown in Table 1.

REFERENCE EXAMPLE 1

A monolithic capacitor was prepared by providing the laminated sintered unit obtained by Example 1 with Ni-Cr layers serving as the first layers of the electrodes for external connection, Ni layers as the second layers, and Ag layers as the third layers under the same conditions as Example 1, without forming the conductive metal oxide layers.

Thus obtained capacitor was subjected to a test similarly to Example 1. As the result, the insulation resistance IR was lowered to $10^9\Omega$ after a lapse of 10 hours and further deteriorated to $10^6\Omega$ after a lapse of 25 hours.

REFERENCE EXAMPLE 2

Employed was the laminated sintered unit obtained by Example 1.

On the other hand, tin tetrachloride ($SnCl_4.5H_2O$), antimony trichloride ($SbCl_3$) and hydrochloric acid (HCl) were mixed in the ratio of 100 g:0.75 g:10 cc and stirred sufficiently.

The laminated sintered unit was heated at 700° C., and the said mixture was sprayed on the end surfaces thereof by the spray method for 10 minutes. The unit was then annealed to be provided with films of tin oxide and coated with silver paste, to form silver electrodes under conditions of 750° C. and 30 minutes.

Thus obtained capacitor thus obtained was subjected to a high-temperature accelerated load life test similarly to Example 1. Application of voltage of 300 V at a temperature of 150° C. leaded to deterioration of insulation resistance IR to $10^6\Omega$ after a lapse of 10 hours.

When voltage of 50 V was applied in an atmosphere of 45° C. in temperature and 95% in relative humidity, the insulation resistance IR was lowered to $10^6\Omega$ after a lapse of 2 hours. The initial value was $10^{10}\Omega$.

What is claimed is:

1. A ceramic capacitor formed by a laminated dielectric ceramic element assembly comprising:
    a dielectric ceramic member consisting of a plurality of layers of metal oxide, respective said layers being not more than 50 $\mu$m in thickness; and
    a plurality of layers of inner metal electrodes laminated with each other through said dielectric ceramic member to form electrostatic capacity,
    metal electrodes for external connection being formed on said dielectric ceramic element assembly to be connected with prescribed ones of said inner metal electrodes for obtaining electrostatic capacity,
    conductive metal oxide layers being formed between said dielectric ceramic element assembly and said metal electrodes for external connection for preventing reduction of said metal oxide forming said dielectric ceramic member.

2. A ceramic capacitor in accordance with claim 1, wherein said conductive metal oxide layers are prepared by manganese oxide, iron oxide, cobalt oxide, nickel oxide, zinc oxide, indium oxide, indium tin oxide or tin oxide.

3. A ceramic capacitor in accordance with claim 2, wherein zinc oxide forming said conductive metal oxide layers contains 0.5 to 99.9 percent by mol of at least one of iron oxide, zirconium oxide, indium oxide, tin oxide and lead oxide.

4. A ceramic capacitor in accordance with claim 3, wherein said conductive metal oxide layers are formed by one of thin film forming methods including sputtering, ion plating, vacuum evaporation and chemical vapor deposition.

5. A ceramic capacitor in accordance with claim 3, wherein said conductive metal oxide layers are formed by employing material not containing at least one of corrosive elements of halogen and sulfur.

6. A ceramic capacitor in accordance with claim 2, wherein said conductive metal oxide layers are formed by one of thin film forming methods including sputtering, ion plating, vacuum evaporation and chemical vapor deposition.

7. A ceramic capacitor in accordance with claim 2, wherein said conductive metal oxide layers are formed by employing material not containing at least one of corrosive elements of halogen and sulfur.

8. A ceramic capacitor in accordance with claim 1, wherein said conductive metal oxide layers are formed by one of thin film forming methods including sputtering, ion plating, vacuum evaporation and chemical vapor deposition.

9. A ceramic capacitor in accordance with claim 1, wherein said conductive metal oxide layers are formed by employing material not containing at least one of corrosive elements of halogen and sulfur.

10. A ceramic capacitor in accordance with claim 1, wherein said metal electrodes for external connection are formed by sputtering, ion plating or vacuum evaporation.

11. A ceramic capacitor in accordance with claim 1, wherein said metal electrodes for external connection are formed by first, second and third layers in order from sides closer to said conductive metal oxide layers.

12. A ceramic capacitor in accordance with claim 11, wherein said first layers of said metal electrodes for external connection are formed by either chromium (Cr), titanium (Ti), tungsten (W), vanadium (V), tantalum (Ta), niobium (Nb), cobalt (Co), iron (Fe), zinc (Zn), molybdenum (Mo), magnesium (Mg), beryllium (Be) or nickel alloy, said second layers by nickel (Ni) and said third layers by silver (Ag), lead (Pb), tin (Sn), lead-tin (Pb-Sn), copper (Cu) or gold (Au).

* * * * *